United States Patent [19]

Niebling et al.

[11] Patent Number: 5,725,285
[45] Date of Patent: Mar. 10, 1998

[54] WHEEL MOUNTING

[75] Inventors: Peter Niebling, Bad Kissingen; Roland Langer, Schwanfeld; Vasilis Hassiotis, Niederwerrn, all of Germany

[73] Assignee: FAG Automobtechnik AG, Germany

[21] Appl. No.: 735,901

[22] Filed: Oct. 23, 1996

[30] Foreign Application Priority Data

Nov. 22, 1995 [DE] Germany ............... 195 43 436.6

[51] Int. Cl.$^6$ ................................................ B60B 27/02
[52] U.S. Cl. ................................... 301/105.1; 384/544
[58] Field of Search ....................... 301/124.1, 125, 301/126, 131, 105.1; 180/258, 259; 384/544; 464/178, 904, 906

[56] References Cited

FOREIGN PATENT DOCUMENTS

| 3126192 | 1/1983 | Germany . | |
|---|---|---|---|
| 4023020 | 1/1992 | Germany | 301/105.1 |
| 4339847 | 6/1995 | Germany . | |
| 4163202 | 6/1992 | Japan | 301/124.1 |

OTHER PUBLICATIONS

Publ. Nr. 05119 DA, "Kraftfahrzeug–Radlagerungen", FAG Kugelfischer Georg Schäfer KGaA Jun. 1996.

*Primary Examiner*—Russell D. Stormer
*Attorney, Agent, or Firm*—Ostrolenk, Faber, Gerb & Soffen, LLP

[57] ABSTRACT

A wheel mount for a vehicle wheel having a wheel flange on the exterior of which is mounted a rotation bearing. The wheel flange bore is internally splined. A cardan shaft has an externally threaded shaft portion projecting into the bore of the wheel flange. A resilient sheet metal nut is internally screw threaded to be screwed onto the threaded portion of the cardan shaft. The nut has a radially outwardly extending flange which engages the wheel flange so as to axially fix the nut at the wheel flange as the nut is tightened on the cardan shaft portion. The outer circumference of the nut, axially at its threaded portion, has radially resilient tongues projecting out into the splining of the wheel flange to permit the nut to be screwed onto the cardan shaft portion and either to permit the nut to be unscrewed or in a different design to prohibit the nut from being unscrewed. Through the nut, the wheel flange and the cardan shaft are secured.

8 Claims, 2 Drawing Sheets

WHEEL MOUNTING

BACKGROUND OF THE INVENTION

The present invention relates to a wheel mount, in particular for the driven front wheels of an automobile, and particularly to securement of a cardan shaft to a wheel flange.

Such wheel mount are known from FAG Publication No. 05119 DA "Kraftfahrzeug-Radlagerungen" ["Automobile Wheel Mountings"] of the assignee hereof, for example on page 3, FIG. 3, or page 7, FIG. 10. In that case, the rolling bearings arranged on a wheel flange or integrated into it are braced axially by a threaded nut which is screwed onto the cardan shaft. This screw connection undergoes high loading, since it has to transmit not only bearing adjustment forces, but also axial and tilting forces applied by the wheel, which occur on bends. Moreover, the nut has to be secured against unintentional loosening, and is secured for example by a split pin. Otherwise, there is a risk that the screw connection will loosen as a result of micromovements in the intermeshing between the cardan shaft and wheel flange. This comment also applies if expansion screws are used instead of nuts, wherein the expansion screws are screwed into an internal thread of the cardan shaft. Such nuts or expansion screws and their securing means are complicated and expensive.

In wheel bearings of the so-called third generation or in wheel bearings assembled, for example, by positive connection to form structural units, as in German Patent Specification 43 39 847, these forces are absorbed in the bearing itself, so that it is merely necessary to secure the cardan shaft and the wheel flange axially. For this purpose, a spring ring, which is snapped into a groove of the cardan shaft, is provided, for example as shown in German Offenlegungsschrift 31 26 192. In such a design, however, there is a requirement for narrow tolerances and there is the tendency for rattling noises to occur.

SUMMARY OF THE INVENTION

The object of the invention is, therefore, to improve a wheel mounting of the above type to avoid the disadvantages, to provide a simple and cost effective connection between the cardan shaft and the wheel flange, wherein the connection is self locking, prestressable and is easy to handle.

This object is achieved using a wheel mount for a vehicle wheel having a wheel flange on the exterior of which is mounted a rotation bearing. The wheel flange has a bore that is internally splined. A cardan shaft has an externally threaded shaft portion that projects into the bore of the wheel flange.

A resilient sheet metal material nut is internally screw threaded to be screwed onto the threaded portion of the cardan shaft portion. The nut has a radially outwardly extending flange which engages the wheel flange so as to axially fix the nut axially at its wheel flange as the nut is tightened on the cardan shaft portion. The outer circumference of the nut axially at its threaded portion has radially resilient tongues projecting out into the splining of the wheel flange to permit the nut to be screwed onto the cardan shaft portion and either to permit the nut to be unscrewed or in a different design to prohibit the nut from being unscrewed. Through the nut, the wheel flange and the cardan shaft are secured.

As a result of the spring effect of the resilient nut, the preset bracing force is maintained over the entire lifetime of the mounting, even after possible wear. In addition, weight reduction is also achieved as compared to previous designs.

Other features and advantages of the present invention will become apparent from the following description of an embodiment of the invention which refers to the accompanying drawings.

DETAILED DESCRIPTION OF THE INVENTION

Figure 1:
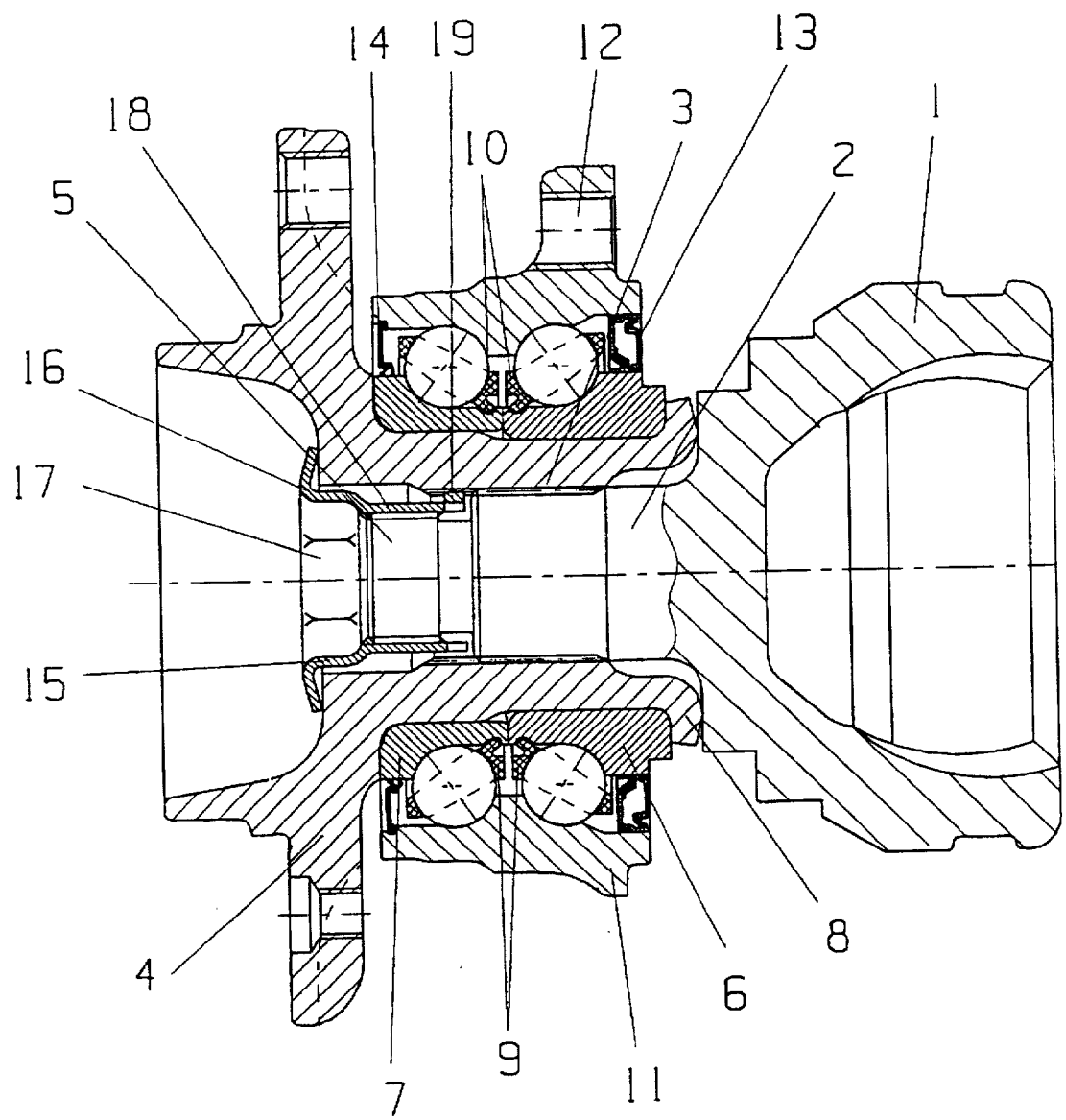
FIG. 1 shows a cross section of a wheel mounting according to the invention.

FIG. 1 shows a cardan shaft 1 which includes a portion that extends to define a journal 2. The journal is provided with splining 3. The splined journal projects into the bore of a wheel flange 4. The wheel flange includes a sleeve portion away from the wheel end of the wheel flange which defines the wheel flange bore within itself. The wheel flange bore likewise has splining in one region nearer to the cardan joint to cooperate with the journal splining. The end of the journal 2 includes a stepped externally threaded portion 5.

A rolling bearing comprising a double row, angular ball bearing is located around the wheel flange 4. The bearing is disposed around the sleeve portion of the wheel flange. The two bearing inner rings 6 and 7 are braced on the flange 4 via a cold formed bead 8 at the end of the flange 4. Those rings have raceways for the bearing balls 9, and the balls are kept spaced from one another by separators or cages 10.

The one piece outer ring 11 is provided with a flange 12, by which the entire unit can be fastened to the vehicle. For sealing off the rolling bearing, sealing disks 13 and 14 are arranged on both axial sides over the gap between the rings.

The wheel flange 4 includes a radially outwardly extending annular surface 21 at the side of the flange away from the cardan shaft 1 for providing a support abutment surface for the below described nut flange 16.

In order to hold the cardan shaft 1 and the wheel flange 4 together, a sleeve shaped threaded nut 15 is screwed onto the threaded end portion 5 of the journal 2. The threaded nut 15 is shaped as a sheet metal sleeve. It includes an axially resilient, radially extending flange 16 for engaging the surface 21. It has a profiled socket or tool engagement portion, particularly a hexagon shaped socket 17 which is shaped to receive a complementary shape tool. It includes an internally threaded portion 18 which receives the threaded portion 5 of the journal shaft. Radially resilient catch or detent tongues 19 are formed outside the portion 18 and engage into the splining 3 in the wheel flange bore for securing against relative rotation between the nut 15 and the flange 4.

The threaded nut 15 is screwed onto the threaded journal portion 5 during assembly. After brief fixing, the resilient catch tongues 19 engage into the splining 3. Detented self locking against relative rotation is achieved. The axially resilient, radial flange 16 is prestressed against the radially extending wall 21 of the wheel flange by application of a specific tightening torque to the nut. The screw connection is thus ready for operation.

Figure 2:
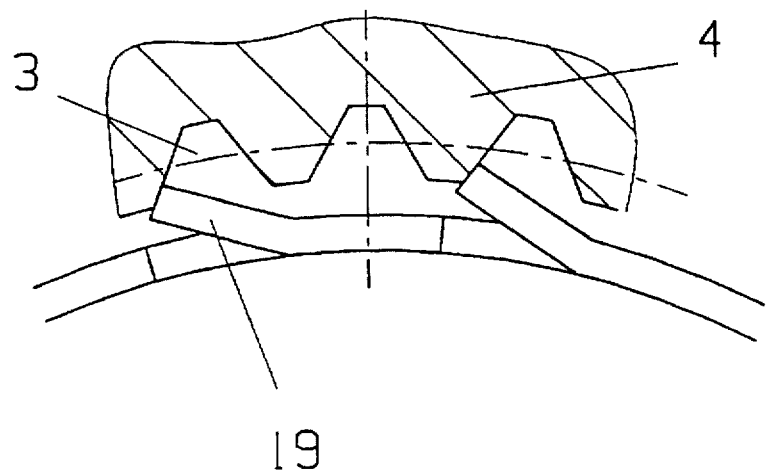
FIG. 2 shows a detail of means for nonreleasable securing of the nut.

In FIG. 2, the resilient tongues 19 project beyond the circumference of the threaded nut 15 and into the splining 3.

As long as the threaded nut is screwed in the clockwise direction, the tongues spring inward. However, upon counterclockwise rotation, they catch in the splining, act like ratchets and form an unreleasable securing means.

Figure 3:
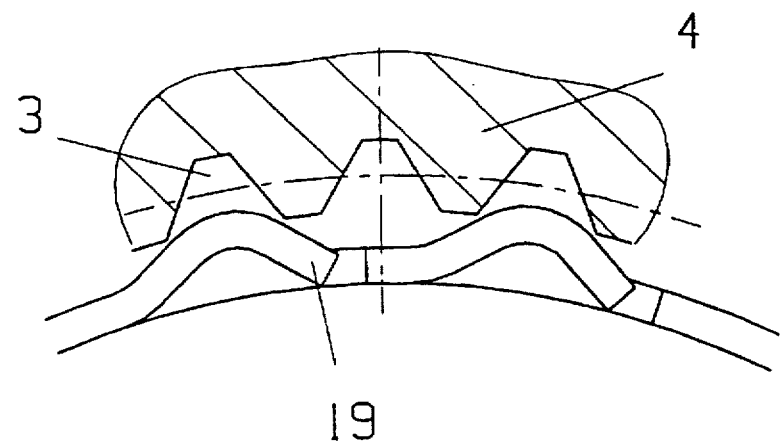
FIG. 3 shows a detail of means for releasable securing of the nut.

In FIG. 3, the free ends of the resilient tongues are bent inward again, so that they can be biased inward and then resiliently spring outward during both directions of rotation of the nut. A detent against relative rotation, which can also be released again, is thereby provided.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wheel mount for a vehicle wheel comprising a wheel flange connectable with a wheel, the wheel flange including a sleeve portion away from the wheel to which the flange may be secured, a rolling bearing inner ring supported on the sleeve portion of the wheel flange, a cardan shaft for being connected to the wheel flange, wherein the shaft and the flange are axially braced relative to each other and rotationally detented relative to each other;

a connection between the cardan shaft and the wheel flange, comprising:

the cardan shaft having a shaft portion with an external screw thread; the sleeve portion of the wheel flange having an internal bore into which the shaft portion of the cardan shaft extends;

a sleeve-like threaded nut which is screwed onto the threaded shaft portion of the cardan shaft, the nut having a radially extending, axially resilient flange shaped and positioned to bear against the wheel flange with prestress, the nut being internally threaded to threadedly receive and tighten to the shaft portion of the cardan shaft, so that through the nut, the cardan shaft and the wheel flange are axially held in position;

the threaded sleeve-like region of the nut having an outer circumference with rotation resisting elements thereon;

the interior of the bore of the wheel flange being splined to receive the rotation resisting elements of the nut, whereby relative rotation of the nut with reference to the wheel flange is restricted and, through the screw connection between the nut and the cardan shaft, relative rotation of the cardan shaft with reference to the wheel flange is restricted.

2. The wheel mount of claim 1, further comprising the wheel flange having a radially extending surface that is opposite to the cardan shaft, and the flange of the threaded nut extending radially out in engagement with the radially extending surface of the wheel flange, such that tightening of the nut on the threaded portion of the cardan shaft urges the flange of the nut against the radially extending portion of the wheel flange.

3. The wheel mount of claim 2, further comprising a device on the nut for receiving and being acted upon by a tool by which the nut is rotated.

4. The wheel mount of claim 3, wherein the device on the nut comprises a profiled shape opening in the nut for receiving a correspondingly profiled shaped tool.

5. The wheel mount of claim 2, wherein the threaded nut is comprised of a sheet metal part.

6. The wheel mount of claim 2, wherein the engaging elements on the nut comprise radially outwardly extending resilient tongues which are radially resilient outwardly to catch in the splining in the bore of the wheel flange when an attempt is made to rotate the nut in the bore of the wheel flange.

7. The wheel mount of claim 6, wherein the engaging elements on the nut comprise radially outwardly resiliently biased tongues which extend into the splining, and are shaped and oriented so as to move out of the splining when the nut is tightened onto the cardan shaft in the bore, but which remain in the splining and do not move out of the splining and thereby prevent rotation of the nut in the unscrewing direction.

8. The wheel mount of claim 6, wherein the engaging elements on the nut comprise radially outwardly resiliently biased tongues which extend into the splining, and are shaped and oriented so as to move out of the splining when the nut is tightened onto the cardan shaft in the bore, and also to move out of the splining when the nut is unscrewed from the cardan shaft.

* * * * *